United States Patent [19]
Kobayashi et al.

[11] Patent Number: 4,627,875
[45] Date of Patent: Dec. 9, 1986

[54] RECORDING LIQUID

[75] Inventors: Masatsune Kobayashi; Tsuyoshi Eida; Shoji Koike, all of Yokohama; Keiko Nakousai, Atsugi, all of Japan

[73] Assignee: Canon Kabushiki Kaisha, Tokyo, Japan

[21] Appl. No.: 828,590

[22] Filed: Feb. 10, 1986

Related U.S. Application Data

[63] Continuation of Ser. No. 647,156, Sep. 4, 1984, abandoned.

[30] Foreign Application Priority Data

Sep. 12, 1983 [JP] Japan ................................. 58-168547

[51] Int. Cl.[4] ............................................. C09D 11/02
[52] U.S. Cl. .......................................................... 106/22
[58] Field of Search ............................................ 106/22

[56] References Cited

U.S. PATENT DOCUMENTS 3,846,141 11/1974 Ostergren et al. ...................... 106/20
4,365,998 12/1982 Sugiyama et al. ...................... 106/22
4,371,582 1/1982 Sugiyama et al. ...................... 428/207

Primary Examiner—Amelia B. Yarbrough
Attorney, Agent, or Firm—Fitzpatrick, Cella, Harper & Scinto

[57] ABSTRACT

A recording liquid comprises C.I.Acid Red 8 as a recording agent for forming an image and a liquid medium comprising at least
(a) a member selected from the group consisting of polyethylene glycol, polyethylene glycol mono methylether and a mixture thereof,
(b) a member selected from the group consisting of diethylene glycol, sulfolane and a mixture thereof,
(c) a member selected from the group consisting of N-methyl-2-pyrrolidone, 1,3-dimethyl-2-imidazolidinone and a mixture thereof, and
(d) water.

4 Claims, 5 Drawing Figures

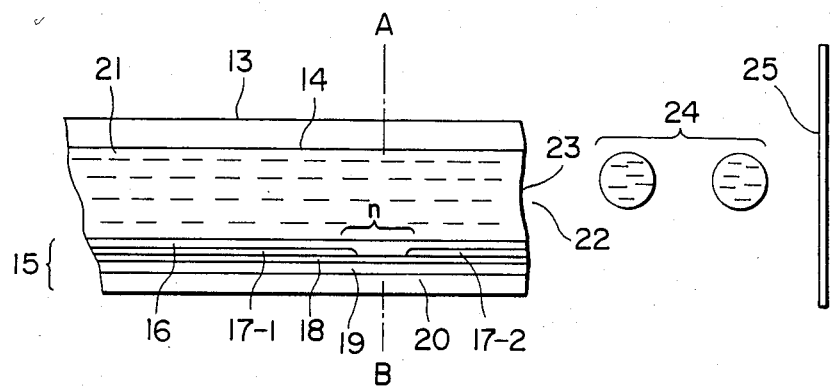
FIG. 3-a
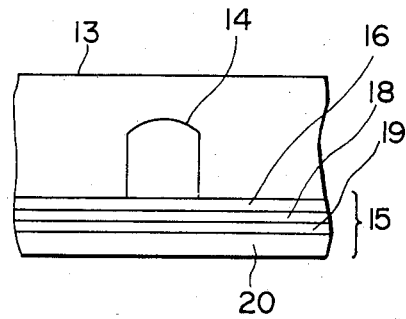
FIG. 3-b
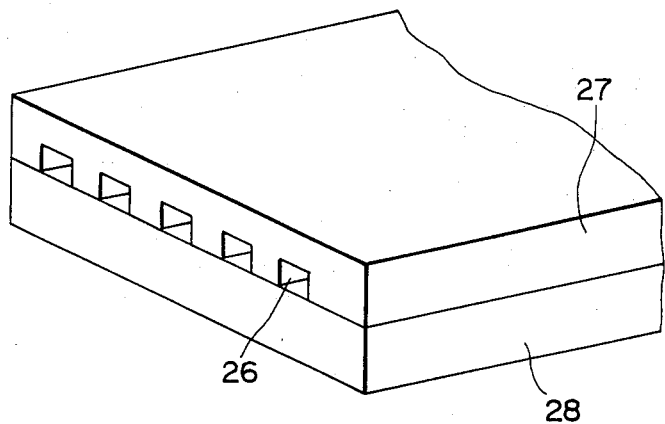
FIG. 4

RECORDING LIQUID

This application is a continuation of application Ser. No. 647,156, filed Sept. 4, 1984, now abandoned.

BACKGROUND OF THE INVENTION

1. Field of the Invention

This invention relates to a new recording liquid and, more particularly, to a recording liquid suitable for a recording system in which droplets of the recording liquid are jetted from a small jet (jet orifice) provided at a recording head and the image is printed on a surface of a recording material.

2. Description of the prior art

Writing materials (such as a fountain pen, felt pen and the like) which make records on recording materials such as paper and the like usually use an ink composed of various dyes dissolved in water or organic solvents.

There are also known compositions composed of various dyes into water or other organic solvents and the like used in the ink jet recording system which records by jetting liquid within the recording head from the jet orifice with vibration by a piezo-oscillator or with electrostatic attractive force and the like by high voltage apply. But, compared with ink for writing materials such as a popular fountain pen, felt pen and the like, the recording liqiud for the ink jet requires more strict conditions as to many characteristics.

Such the ink jet recording method is that the recording was carried out by jetting droplets of the recording liquid, the so-called ink, and adhering this jetting ink to a record-receiving member. The recording liquid is comprised of a recording agent (using dye or pigment) and a liquid medium (water, various organic solvents, or a mixture thereof) capable of solving or dispersing the recording agent, as basic components, and if desired, various additive agents are added.

In such a recording method, there are various systems depending methods for generating droplets and methods for controlling the jet direction. An example of system is shown in FIG. 1.

FIG. 1 shows an apparatus in which a recording signal is applied to a recording head part containing the piezo-oscillator and droplets of the recording liquid are generated to effect recording in response to the signal. In FIG. 1, the recording head is designated by 1, the piezo-oscillator by 2a an oscillating plate by 2b, an inlet of ink by 3, a liquid chamber in the head by 4 and a liquid jetting portion (jetting orifice) by 5. Recording liquid 7 is introduced into the liquid chamber 4 from a storage tank 6 through a supply tube 8. In case of necessity, intermediate processing means 9 such as pump or filter may be provided in the supply tube 8. Recording signal S is converted into a pulse by signal processing means 10 such as a pulse converter and then applied to the piezo-oscillator 2a. Change in pressure on the recording liquid within the liquid chamber 4 caused by the signal results in droplets 11 of the recording liquid 7 being jetted through the jet orifice 5. Thus, an image is printed on the surface of the record-receiving member 12 with the droplets.

There are known various apparatuses other than the above mentioned apparatus. For example, FIG. 2, shows a modified embodiment of that in FIG. 1. In the modified embodiment, a liquid chamber 4 is a nozzle form, and around provided with a cylindrical piezo-oscillator (in this apparatus, a mechanism generating droplets is essentially the same as that (shown in FIG. 1). There are known an apparatus in which charged droplets are continuously generated to use a portion of the droplets for recording, another apparatus in which heat energy corresponding to a recording signal is applied to a recording liquid in a chamber of a recording head to generate droplets by the heat energy, and the like.

An embodiment is shown in FIGS. 3-a, 3-b and 4.

A head 13 is manufactured by jointing a plate such as glass, cermics, plastics, and the like, having a groove 14 to a head-generating head 15 used for a heat-sensitive recording process (A thin film head is shown in the Figs., however a heat-generating head is not restricted to this construction). The heat-generating head 15 is constituted of a protective film 16 made of silicon oxide and the like, aluminum electrodes 17-1 and 17-2, a resistive heater layer 18 made of nichrome and the like, a heat-accumulating layer 19, and a substrate 20 having an excellent heat-releasing property such as alumina and the like.

An ink 21 arrives at the jet orifice, so that a meniscus 23 is formed by a pressure P.

When an electric signal is applied to electrodes 17-1 and 17-2, heat is rapidly generated at the region indicated by "n" in the heat generating head 15, and a bubble is formed in ink 21 contacting the "n" region.

The pressure due to the formation of the bubble projects the meniscus 23 and a recording droplet of ink 21 is ejected as a droplet 24 through an orifice 22 and projected to the record-receiving member 25.

FIG. 4 is a schematic diagram of multi-head made of a plurality of heads as shown in FIG. 3-a. The multi-head is fabricated by adhering a glass plate 27 provided with multi-groove 26 to the heat generating head 28 as illustrated in FIG. 3-a.

FIG. 3-a is a schematic cross sectional view of the head 13 taken along the ink flow path while FIG. 3-b is a schematic cross sectional view of FIG. 3-a taken along the A-B line.

In the past, there are known the recording liquid in which various dyes and pigments were dissolved and dispersed in aqueous or nonaqueous solvent, for example, as shown in Japanese Patent Publication Nos. 8361/1975, 40484/1976, 13126/1977, and 13127/1977, and Japanese Patent Laid Open No. 95008/1975. Desirable conditions for such recording liquid are shown as follow.

(1) Having a property of liquid (viscosity, surface tension, conductivity and the like) matched to jet conditions (actuation voltage of piezoelectric device, actuation frequency, shape and quality of material of the orifice, diameter of the orifice and the like).

(2) Not clogging the minute jet orifice and hole of a capillary because long time storge property is very good.

(3) Fixation to the record receiving members (paper, film and the like) can proceed rapidly, circumference of a dot is smooth, and the blur is little.

(4) A color tone of the printed image is sharp and the density is high.

(5) Water resisting property and light fastness of the printed image are excellent.

(6) Not corroding materials for handling the recording liquid (vessel, joint tube, seal materials and the like).

(7) Safety to a bad smell, toxicity, inflammability and the like is excellent.

It is very difficult to satisfy above mentioned conditions at the same time. In this point, the above-mentioned prior art is not satisfactory.

Since the recording liquid is composed basically of dye and the solvent, the above mentioned properties of recording liquid are determined by matching of dye to solvent. Therefore, it is very important in the field of the art to effect matching of dye to solvent compositions so as to have the above-mentioned properties in the recording liquid.

SUMMARY OF THE INVENTION

An object of the present invention is to provide a recording liquid having a very good long time storage propety and not easily clogging the jet orifice.

Another object of the present invention is to provide a recording liquid which has a wide allowance for changing of temperature and actuation condition.

A further object of the present ivnetion is to provide a recording liquid capable of being rapidly fixed to record receiving members and producing sharp images.

Still another object of the present invention is to provide a recording liquid having very good water resisting property and very good light fastness or the printed matter.

A still further object of the present invention is to provide a recording liquid having high safety and not corroding materials for handling the recording liquid (vessel sealing materials and the like).

According to the present invention, there is provided a recording liquid which comprises C.I.Acid Red 8 as a recording agent for forming an image and a liquid medium comprising at least (a) a member selected from the group consisting of polyethylene glycol, polyethylene glycol mono methyl ether and a mixture thereof;

(b) a member selected from the group consisiting of diethylene glycol, sulfolane and a mixture thereof;

(c) a member selected from the group consisting of n-methyl-2-pyrrolidone, 1,3-dimethyl-2-imidazolidinone and a mixture thereof; and (d) water.

BRIEF DESCRIPTION OF THE DRAWING

FIG. 3-$a$ and FIG. 3-$b$ are a longitudinal sectional view and a transverse sectional view of a main section of other recording apparatus, respectively; and FIG. 4 is a perspective view of the outside appearance of a multi-head formed by multifying the head as shown in FIG. 3-$a$ and FIG. 3-$b$.

DESCRIPTION OF THE PREFERRED EMBODIMENTS

Figure 1:
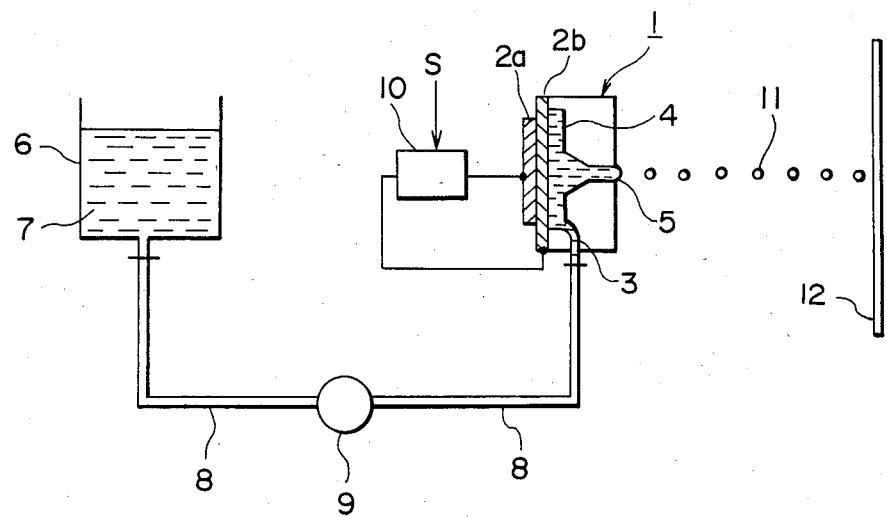
FIG. 1 and FIG. 2 are schematic views of the ink jet recording apparatus.
Figure 2:
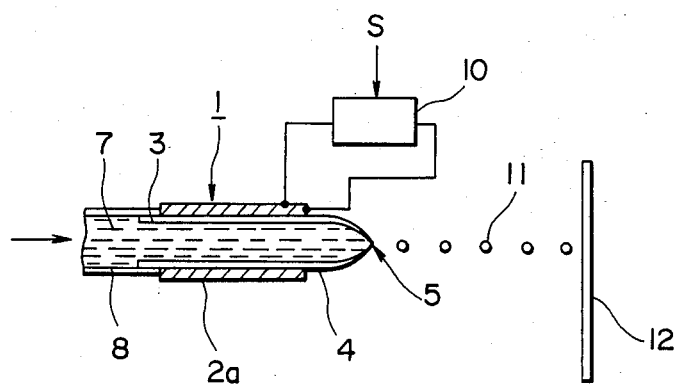

According to the present invention, variation of the viscosity of the recording liquid corresponding to variation of an environment temperature is small, and the recording liquid is of small variation of the viscosity and the surface tension when the water content varies.

Therefore, when the environment temperature varies to a great extent, a jet state is always kept constant, and moreover, increase in viscosity by evaporation of water from a tip of a nozzle neither causes any difficulty upon jetting again after stood nor clogging.

The recording liquid according to the present invention is not subjected to change in the physical properties and precipitation of solid matters during storage, and various members can be as the record receiving members regardless of the kind of the material. The fixation can proceed rapidly and water resisting property, light fastness, wear resistance and resolution of the resulting image are excellent. The content of C.I.Acid Red 8 is determined depending upon the kind of the liquid medium and the properties which are required to the recording liquid. In general, it is, to total weight of the recording liquid, 0.1–20 wt %, preferably 0.5–15 wt % and more preferably 1–10 wt %. The dye can be used alone or in combination (i.e. the dye as the essential component may be used in combination with various dyes such as direct dye, acid dye and the like).

Content of the liquid medium used in the present invention in the recording liquid is, in general, 1–30 wt % of polyethylene glycol, polyethylene glycol monomethyl ether, or a mixture thereof, 1–40 wt % of diethylene glycol, sulfolane or a mixture thereof, 1–40 wt % of N-methyl-2-pyrrolidone, 1,3-dimethyl-2-imidazolidinone or a mixture thereof, and 10–90 wt % of water, and preferably, 5–20 wt % of polyethylene glycol, polyethylene glycol monomethyl ether or a mixture thereof, 5–30 wt % of diethylene glycol or sulfolane or a mixture thereof, 5–30 wt % of N-methyl-2-pyrrolidone or 1,3-dimethyl-2-imidazolidinone or a mixture thereof and 10–70 wt % of water.

The recording liquid prepared from such components according to the present invention has excellent and well-balanced recording properties (signal responsing property, stability of droplet formation, jet stability, long time continuous recording property, and jet stability after a long rest time of recording operation), storge stability, fixability to record receiving members, and light fastness, weatherability, and water resisting property of the recorded images. For further improving such properties, various known additives may be added. For example, there may be mentioned a viscosity controlling agent such as poly(vinyl alcohol), celluloses, water-soluble resins and the like, a surface tension controlling agent such as cationic surfactants, anionic surfactants, nonionic surfactants, diethanol amine, triethanol amine and the like, a pH controlling agent such as buffer solutions, and antifungal agent and the like.

When the recording liquid is to be used for an ink jet recording system where the recording liquid is electrically charged, there may be added a specific resistance controlling agent such as lithium chloride, ammonium chloride, sodium chloride and the like inorganic salts.

When the recording liquid is used for an ink jet system for jetting the recording liquid by means of thermal energy, the thermal physical properties such as specific heat, coefficient of thermal expansion, thermal conductivity and the like may be adjusted.

The present invention is illustrated in the following Examples.

EXAMPLE 1

| | |
|---|---|
| C.I. Acid Red 8 | 3 parts by weight |
| Polyethylene glycol monomethyl ether | 15 parts by weight (viscosity-average moleclar weight: 210–240) |
| Diethylene glycol | 15 parts by weight |
| N—methyl-2-pyrrolidone | 15 parts by weight |
| Water | 52 parts by weight |

The above mentioned components were sufficiently mixed in a vessel and pressure-filtered by means of a Teflon filter of hole size of 1μ, and the resulting product was deaerated by a vacuum pump.

The resulting recording liquid was tested as to $T_1$–$T_5$ (infra) by using a recording apparatus which comprises an on-demand type recoreing head (the jet orifice with a diameter of 50μ, the piezo-oscillator actuation voltage of 60 V, a frequency of 4 KHz) capable of jettling the recording liquid with the piezo-oscillator. Good result was obtained in each of the tests.

($T_1$) Long time storage property of the recording liquid:

The above mentioned recording liquid was bottled and sealed in a glass vessel and stored for six months at −30° C. or 60° C. In each case there was not observed any insoluble matter precipitated, and physical properties and color of the liquid did not change either.

($T_2$) Jet stability:

A 24-hour continuous ejection of the recording liquid was effected in an atmosphere of a room temperature, 5° C., or 40° C. In each condition, a stable and high quality recording was accomplished throughout.

($T_3$) Jet responsiveness:

In one experiment, an intermittent ink jet at intervals of every two seconds was carried out. In the other, an ink jet after leaving alone for two months was carried out. In both experiments, stable and uniform recording was performed without clogging at the tip of orifice.

($T_4$) Quality of recorded image:

Recorded image was high in density and in sharpness. Reduction ratio of density measured after exposing the recorded image to a room light for three months was found to be less than 1%. When the recorded image was dipped in water for a minute, only a very slight blur of image was observed.

($T_5$) Fixability to record receiving members:

After 15 seconds of printing, the printed portion of the image recording materials listed in the following Table were rubbed with a finger to test image aberration and blur of the ink. No image aberration and blur of the ink were observed, and the recording liquid showed excellent fixability.

| Image Receiving Material | Type | Supplier |
| --- | --- | --- |
| Gin Kan | Wood free paper (High class) | Sanyo-Kokusaku Pulp Co., Ltd. |
| Seven Star | Wood free paper (High class) | Hokuetsu Paper Mills Co., Ltd. |
| Shiro Botan | Middle class | Honshu Paper Mfg. Co., Ltd. |
| Toyo Roshi No. 4 | Non-sized paper | Toyo Roshi Co., Ltd. |

EXAMPLE 2

| | |
| --- | --- |
| Polyethylene glycol Monomethyl ether | 10 parts by weight (viscosity-average molecular weight: 210–240) |
| Sulfolane | 10 parts by weight |
| N—methyl-2-pyrrolidone | 20 parts by weight |
| C.I. Acid Red 8 | 3 parts by weight |
| Water | 57 parts by weight |

Recording liquid of the above mentioned composition was prepared by the same procedure as in Example 1. The resulting recording liquid was tested as to ($T_1$)–($T_5$) as shown in Example 1 by using a recording apparatus having an on-demand type multi head (the jet orifice with a diameter of 35μ, heating resistor of resistance value of 150Ω, actuation voltage of 30 V, frequency of 2 KHz) which generates droplets for recording by applying heat energy to the recording liquid in the recording head. Excellent results were obtained in all cases.

EXAMPLE 3

| | |
| --- | --- |
| C.I. Acid Red 8 | 5 parts by weight |
| Polyethylene glycol | 10 parts by weight (viscosity-average molecular weight: 300) |
| Sulfolane | 15 parts by weight |
| 1,3-dimethyl-2-imidazolidinone | 10 parts by weight |
| Water | 60 parts by weight |

Recording liquid of the above mentioned composition was prepared by the same procedure as in Example 1. The resulting recording liquid was filled in a felt pen and evaluated for water in a felt pen and evaluated for water resisting property of the composition written on a middle class paper and writing property when stood for 24 hours after the cap was removed from the pen.

The recording liquid in this example was excellent for both water resisting property and writing property after allowing to stand.

EXAMPLES 4–13

The recording liquids of the composition as shown in Table 1 were prepared by the same procedure as in Example 1. The resulting recording liquids were tested as to ($T_1$–$T_5$) as shown in Example 1. The number in parentheses in Table 1 denotes the component (weight) ratio.

These recording liquids exhibited very good long time preservation property, recording property, fixability of a recording image, degree of sharpness and the like.

| Example No. | Dye | Other liquid medium composition | |
| --- | --- | --- | --- |
| 4 | C.I. Acid Red 8 (3) | Polyethylene glycol monomethyl ether (viscosity-average molecular weight: 210–240) | (15) |
| | | Diethylene glycol | (15) |
| | | 1,3-dimethyl-2-imidazolidinone | (15) |
| | | Water | (52) |
| 5 | C.I. Acid Red 8 (3) | Polyethylene glycol (viscosity-average molecular weight: 300) | (10) |
| | | diethylene glycol | (10) |
| | | N—methyl-2-pyrrolidone | (20) |
| | | Water | (57) |
| 6 | C.I. Acid Red 8 (3) | Polyethylene glycol monomethyl ether (viscosity-average molecular weight: 210–240) | (10) |
| | | Diethylene glycol | (15) |
| | | N—methyl-2-pyrrolidone | (10) |
| | | Water | (62) |
| 7 | C.I. Acid Red 8 (3) | Polyethylene glycol (viscosity-average molecular weight: 210–240) | (10) |
| | | Sulfolane | (10) |
| | | Polyethyleneglycol (viscosity-average molecular weight: 300) | (5) |
| | | 1,3-dimethyl-2- | (10) |

| Example No. | Dye | Other liquid medium composition | |
|---|---|---|---|
| | | imidazolidinone | |
| | | Water | (62) |
| 8 | C.I. Acid Red 8 (4) | Polyethylene glycol (viscosity-average molecular weight: 300) | (15) |
| | | Diethylene glycol | (10) |
| | | N—methyl-2-pyrrolidone | (15) |
| | | Water | (56) |
| 9 | C.I. Acid Red 8 (4) | Polyethylene glycol (viscosity-average molecular weight: 300) | (15) |
| | | Sulfolane | (15) |
| | | N—methyl-2-pyrrolidone | (15) |
| | | Water | (51) |
| 10 | C.I. Acid Red 8 (3) | Polyethylene glycol monomethyl ether (viscosity-average molecular weight: 210–240) | (15) |
| | | Sulfolane | (10) |
| | | 1,3-dimethyl-2-imidazolidinone | (15) |
| | | triethanolamine | (1) |
| | | Water | (56) |
| 11 | C.I. Acid Red 8 (3) | Polyethylene glycol monomethyl ether (viscosity-average molecular weight: 210–240) | (15) |
| | | Diethylenen glycol | (10) |
| | | N—methyl-2-pyrrolidone | (15) |
| | | urea | (1) |
| | | Water | (56) |
| 12 | C.I. Acid Red 8 (3) | Polyethylene glycol monomethyl ether (viscosity-average molecular weight: 210–240) | (10) |
| | | Diethyleneglycol | (10) |
| | | 1,3-dimethyl-2-imidazolidinone | (10) |
| | | Urea | (1) |
| | | Acetynol EH (Kawaken Fine chemicals Co., Ltd.) | (0.1) |
| | | Water | (65.9) |
| 13 | C.I. Acid Red 8 (4) | Polyethylene glycol monomethyl ether (viscosity-average molecular weight: 210–240) | (10) |
| | | Diethylene glycol | (15) |
| | | N—methyl-2-pyrrolidone | (10) |
| | | Polyethylene glycol (viscosity-average molecular weight: 200) | (5) |
| | | Triethanolamine | (1) |
| | | Acetynol EH | (0.1) |
| | | Water | (54.9) |

As explained above, the advantages of the recording liquid according to the present invention are as shown below.

(1) Long time storage property of the liquid is very good and the jet orifice does not easily clog.

(2) Allowance is wide for changing of temperature and actuation condition.

(3) Fixation to the record receiving members can proceed rapidly and the resulting image is sharp.

(4) Water resisting property and light fastness of the printed matter are very good.

(5) The recording liquid has high safety and does not corrode materials for handling the recording liquid (vessel sealing materials and the like).

What we claim is:

1. A recording liquid which comprises (1) 0.1 to 20 weight percent C.I. Acid Red 8 as a recording agent for forming an image and (2) a liquid medium comprising at least
   (a) 1 to 30 weight percent of a member selected from the group consisting of polyethylene glycol, polyethylene glycol monomethyl ether and a mixture thereof,
   (b) 1 to 40 weight percent of a member selected from the group consisting of diethylene glycol, sulfolane and a mixture thereof,
   (c) 1 to 40 weight percent of a member selected from the group consisting of N-methyl-2-pyrrolidone, 1,3-dimethyl-2-imidazolidinone and a mixture thereof, and
   (d) 10 to 90 weight percent water; said weight percents being based on the total weight of the recording liquid.

2. A recording liquid according to claim 1 wherein the content of C.I. Acid Red 8 is 0.5 to 15 weight percent based on the total weight of the recording liquid.

3. A recording liquid according to claim 1 wherein the content of C.I. Acid Red 8 is 1 to 10 weight percent based on the total weight of the recording liquid.

4. A recording liquid according to claim 1 wherein the content of component (b) is 5 to 30 weight percent, the content of component (c) is 5 to 30 weight percent, and the content of water is 10 to 70 weight percent based on the total weight of the recording liquid.

* * * * *